United States Patent
Burke et al.

(10) Patent No.: US 7,889,463 B1
(45) Date of Patent: Feb. 15, 2011

(54) FUSED LEAD WIRE FOR BALLAST PROTECTION

(75) Inventors: Robert V. Burke, Indianapolis, IN (US); Michael Litvinovich, Naperville, IL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 11/404,431

(22) Filed: Apr. 14, 2006

Related U.S. Application Data

(60) Provisional application No. 60/687,232, filed on Jun. 3, 2005.

(51) Int. Cl.
*H02H 5/04* (2006.01)

(52) U.S. Cl. .................. 361/37; 361/93.8; 361/103; 361/268

(58) Field of Classification Search ............ 315/290; 361/24, 37, 93.8, 103, 268
See application file for complete search history.

(56) References Cited

U.S. PATENT DOCUMENTS

| | | | |
|---|---|---|---|
| 3,475,653 A | 10/1969 | Odenberg | |
| 3,600,634 A | 8/1971 | Muench | |
| 4,626,952 A | 12/1986 | Morikawa | |
| 4,921,451 A | 5/1990 | Carlson | |
| 5,224,261 A * | 7/1993 | Morrill, Jr. | 29/623 |
| 6,812,818 B2 * | 11/2004 | Lee | 336/55 |
| 7,019,467 B2 * | 3/2006 | Sokoly et al. | 315/290 |
| 2002/0089085 A1* | 7/2002 | Kim | 264/272.18 |
| 2006/0273876 A1* | 12/2006 | Pachla et al. | 337/140 |

FOREIGN PATENT DOCUMENTS

| JP | 60198714 A | * 10/1985 |
|---|---|---|
| JP | 2004311350 A | * 11/2004 |

OTHER PUBLICATIONS

Abstract for JP 2004311350 A. Nov. 4, 2004.*

* cited by examiner

*Primary Examiner*—Jared J Fureman
*Assistant Examiner*—Christopher J Clark
(74) *Attorney, Agent, or Firm*—Waddey & Patterson; Mark J. Patterson; Gary L. Montle

(57) ABSTRACT

A ballast having fused leads protects against uncommon, but harmful, ballast failures. The fused leads prevent a current in the primary coil of the ballast from exceeding a potentially damaging value. A thermal protector shorts the primary ballast coil if the temperature of the secondary ballast coil exceeds a potentially damaging value. Since the thermal protector permanently disables the ballast, potentially damaging repetitive overheating of the ballast is prevented.

1 Claim, 2 Drawing Sheets

FUSED LEAD WIRE FOR BALLAST PROTECTION

This application is a Non-Provisional Utility application which claims benefit of U.S. Provisional Patent Application Ser. No. 60/687,232 filed Jun. 3, 2005, entitled "Fused Lead Wire for Ballast Protection" which is hereby incorporated by reference.

A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

BACKGROUND OF THE INVENTION

Core and coil ballasts can express certain very rare modes of failure wherein the coils heat up rapidly due to excessive currents. In some instances, the temperatures can become so high that the ballast insulation smokes or ignites. Although these malfunctions are very uncommon, they should be avoided whenever possible since they can potentially cause serious personal injury or property damage.

Conventional automatically resettable thermal protection, if built into ballasts, has not proved effective because the temperature of the coils can rise to destructive levels so quickly that the automatically resettable thermal protectors cannot react in time. Automatically resettable thermal protectors also allow destructive operating temperatures to potentially reoccur many times because the system will automatically reset once the protection circuit has removed power and the system has had time to cool. While one such reoccurrence may not result in a catastrophic failure, many such cycles can almost be guaranteed to induce a failure that is likely benign, but possibly violent in nature.

Non-resettable types of thermal protectors, based on melting wax, or other materials, have been used in transformers, which are similar in character to ballasts. Such melting-material thermal protectors are known to degrade over time. Thus, failures are common at safe operating temperatures because a downward shift occurs from the initial temperature trip-point over time.

High intensity discharge (HID) lighting is a growing sector in the lighting industry. Initially HID lighting systems were predominantly used for outdoor applications. Now they are being increasingly used for more and more indoor applications. While a violent end to a ballast's life may not present a significant hazard when it occurs in outdoor applications, the potential for damage is increased when the system is used in connection with indoor applications. In many cases, the possibility of a violent end of life failure, though being very small, makes usage of HID lighting systems prohibitive for some critical indoor applications. Having comprehensive ballast protection will open those new applications to HID lighting.

Therefore, it is an object of present invention to provide an open core and coil ballast with improved features that ensure effective prevention of non-passive failure at the ballast end of life.

It is another object of the present invention to provide a ballast that effectively limits operating temperatures and prevents catastrophic temperatures and consequential non-passive failures in the lighting systems.

SUMMARY OF THE INVENTION

An embodiment of the present invention is directed toward a ballast for a high intensity discharge lighting system. The ballast includes at least one ballast lead having an integral fuse. The fuse is incorporated into a primary coil lead of the ballast. The fuse is preferably positioned inside a dielectric tube and covered with a dielectric sleeving for protection. A thermal protector which shorts a circuit containing the integral fuse if a temperature of the ballast exceeds a predetermined threshold is included in the ballast. The thermal protector is connected between any two taps on a primary coil of the ballast. The thermal protector has normally open contacts that are only connected when the threshold is exceeded Another embodiment of the present invention is directed toward a method of protecting a HID ballast from overheating. In accordance with the method, the ballast is provided with fused leads for disabling the ballast when a current threshold in the fused lead exceeds a predetermined threshold. The fused leads are electrically connected to a primary coil of the ballast. The ballast is also provided with a thermal protector that permanently disables the ballast when a temperature of the ballast exceeds a predetermined temperature threshold. The thermal protector is used to disable at least one of the fused leads when the predetermined temperature threshold is exceeded by creating a fuse disabling circuit condition.

Yet another embodiment of the present invention is directed toward a ballast for a HID light system. The ballast includes at least one fused ballast lead having an integral fuse for disabling the ballast when a current in the fused ballast lead exceeds a predetermined threshold. The fused ballast lead is preferably connected to a primary coil of the ballast. A thermal protector detects a temperature of the ballast and disables the fuse when the temperature exceeds a predetermined threshold. The thermal protector has normally open contacts and disables the fuse by shorting a portion of the primary coil.

DETAILED DESCRIPTION OF THE INVENTION

When used in applications, HID lighting systems are connected to an AC input voltage line by means of two lead wires that are referred to as the "line lead wire" and the "common lead wire". The value of the AC line voltage could be any one of many standard voltages, such as 120V, 277V, etc. Each line lead wire is dedicated to one of the standard voltages. Some HID ballasts are designed for only one standard input voltage. These HID ballasts only have one line lead wire and one common lead wire. Many other types of HID ballast are designed for operation with more than one input voltage and, thus, are provided with more than one line lead wire each of which is dedicated to a different AC voltage and one common lead wire. In these applications, the ballasts are connected to the AC input voltage line by means of one corresponding line lead wire and the common lead wire. As an example, FIG. 1 shows a ballast designed to operate on one of two different line voltages.

Figure 1:
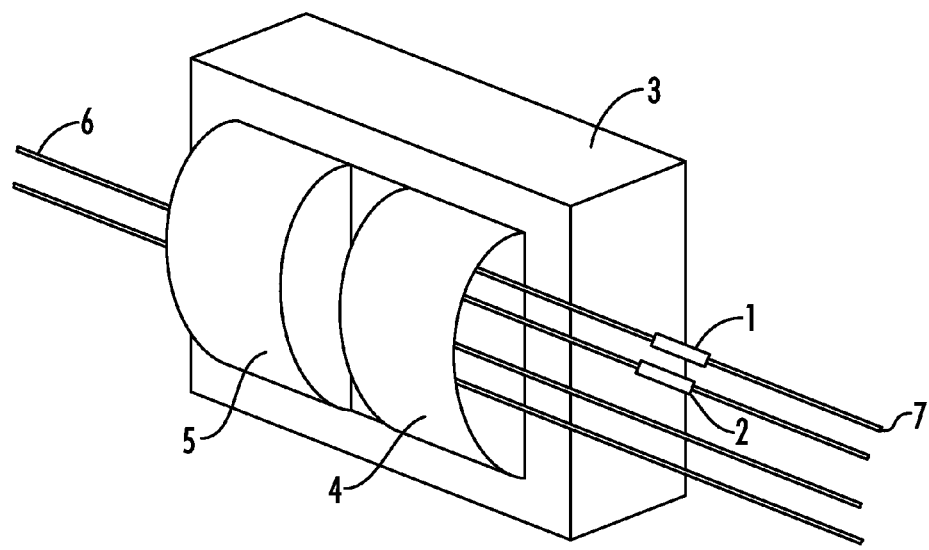
FIG. 1 is a perspective view of an open core and coil ballast constructed in accordance with an embodiment of the present invention.

Referring now to FIG. 1, a preferred embodiment of the present invention improves upon the prior art by providing fused line lead wires 1 and 2 for a ballast such as a high intensity discharge (HID) lamp ballast. Actual ballasts may have one, two, or more fused line lead wires only one of which will be connected to the AC line during ballast operation. The second lead wire connected to the AC line will be a common lead wire that does not incorporate a fuse. The ballast of FIG. 1 includes a core 3, a primary coil 4, secondary coil 5 and lead wires 6 and 7. The ballast of FIG. 1 is shown having two line lead wires with incorporated fuses. However, the present invention is not limited to a ballast having any particular number of fused line lead wires. In the embodiment shown, only one of the lead wires 7 that incorporate the electrical fuses 1 and 2 will be connected to the AC line during normal ballast operation. For example, the lead wire with fuse 1 is intended for a 277 volt AC voltage input and the lead wire having fuse 2 is intended for a 120 volt AC voltage input. The fused leads 1 and 2 protect against the rare modes of failure wherein the coils heat up very rapidly due to excessive currents thereby preventing the high temperatures and potentially adverse effects thereof.

Figure 2:
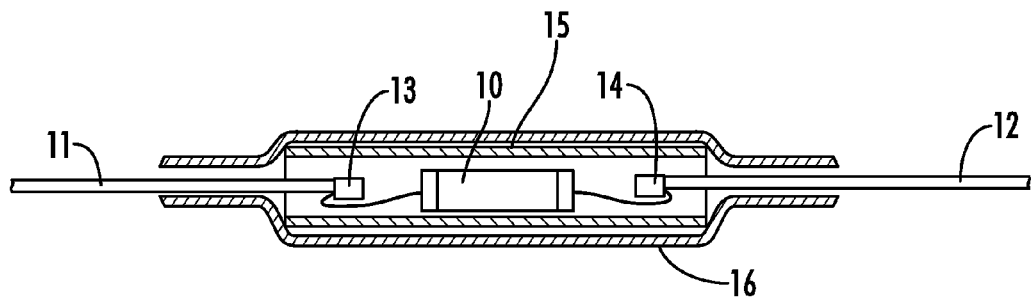
FIG. 2 is a diagram of a lead wire incorporating an integral fuse.

Referring now to FIG. 2, a preferred embodiment for a fuse structure 10 for use in connection with the present invention is shown. However, those skilled in the art will recognize that the present invention is not limited to the embodiment shown. The fuse 10 is connected to the end portions of the conductive, isolated lead wires 11 and 12 with a set of crimps 13 and 14. The crimps 13 and 14 create an electrical and mechanical connection between the lead wire 11 and 12 and the fuse 10. The fuse 10 is placed inside a rigid dielectric tube 15 that provides both mechanical protection and electrical insulation for the fuse 10. The size of the fuse used depends upon the operating characteristics of the ballast into which it will be incorporated. A heat-shrink type sleeving 16 is used to cover the rigid dielectric tube 15 and lead wires 11 and 12. The sleeving 16 further assures the mechanical integrity and electrical isolation of the entire fuse assembly.

Figure 3A:
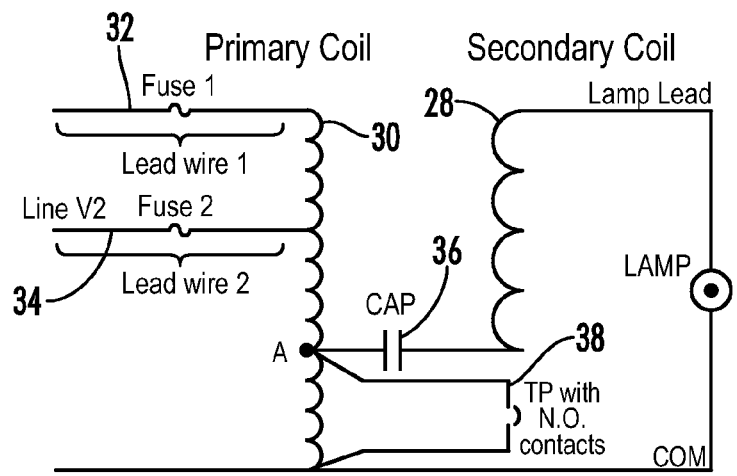
FIGS. 3(A), (B) & (C) are schematic diagrams of lighting systems that include the thermal protector and fused leads of embodiments of the present invention.
Figure 3B:
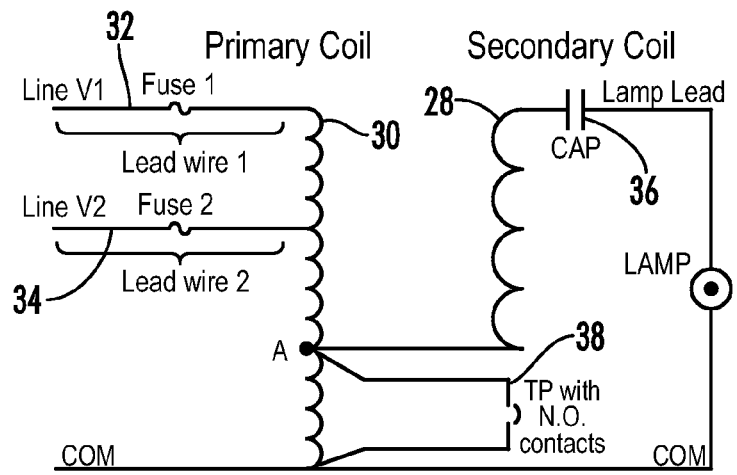
Figure 3C:
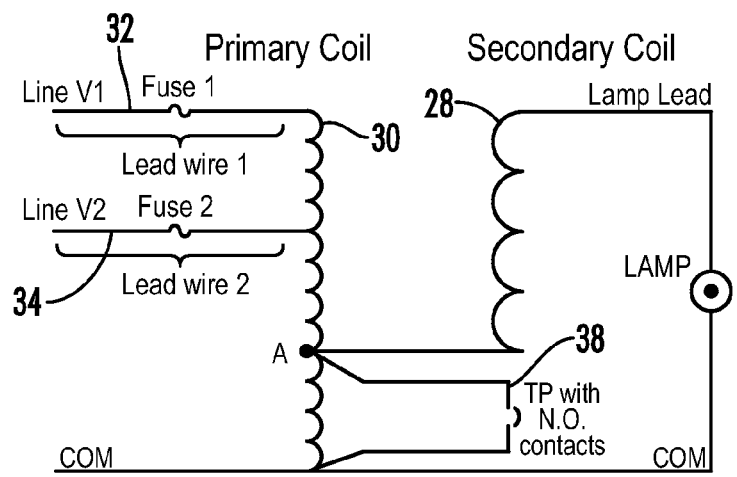

Referring now to FIGS. 3(A-C), exemplary ballasts for HID lighting systems constructed in accordance with embodiments of the present invention are shown. Those skilled in the art will recognize that the ballast schematics shown in FIGS. 3(A-C) are exemplary only and the present invention could be incorporated into practically any ballast design. In addition to the protective fuses 32 and 34 in the lead wires, the ballasts of FIGS. 3(A-C) have a thermal protector 38 with normally open contacts. One end of the thermal protector 38 is connected to the common end of the primary coil 30 while the other end is connected to the cross-over tap of the primary coil marked A in FIGS. 3(A-C). While the thermal protector arrangement of FIGS. 3(A-C) is in accordance with an embodiment of the present invention, the present invention is not limited to any particular points of connection for the thermal protector 38. The thermal protector 38 shown in the figures will work equally well when connected between any two different taps on the primary coil. Thus, FIGS. 3(A-C) illustrate only a few of the many possible practical connections of the thermal protector. The body of the thermal protector 38 is preferably placed on the secondary coil so that the thermal protector senses the temperature of the secondary coil.

The embodiments of FIGS. 3(A-C) utilize a thermal protector to protect against faults in the secondary coil 28 that may not induce currents in the primary coil 30 sufficient to open the fused leads. In the case of a primary coil 30 fault, such as a turn-to-turn short and/or coil-to-core short, the input current through the fused lead wire 32 or 34, depending upon which of the lead wires was used to energize the ballast, increases significantly, the corresponding lead wire fuse 32 or 34 opens, and the ballast becomes permanently de-energized before the primary coil 30 temperature reaches potentially harmful values. When a secondary coil 28 fault such as a turn-to-turn short or coil-to-core short occurs, the current in the secondary coil 28 will increase and cause secondary coil 28 overheating. However, the ballast input current in the lead wires 32 and 34 may or may not increase significantly and exceed the threshold required to open the lead wire fuses. If during secondary coil 28 failure the input current does not increase enough to open the input fuses 32 and 34, the temperature of the secondary coil 28 will continue to rise. However, the rising temperature of the secondary coil 28 will cause the temperature of the thermal protector 38 to rise. Once the thermal protector 38 reaches its trip level, the thermal protector's normally open contacts close and create a short circuit condition in the primary coil 30. As a result, the input current through the lead wire 32 or 34 which is energized increases significantly, the lead wire fuse opens and the ballast becomes permanently de-energized. Since the ballast is permanently disabled by the tripping of the thermal protector 38, the thermal protector 38 trip level should be set at a level significantly higher than normal coil operating temperature such that during normal ballast operation tripping does not occur. At the same time, the thermal protector trip temperature should be set well below the harmful temperature limit such that no violent failures which might potentially cause damage can occur.

The fuses 32 and 34 being incorporated into the lead wires are preferably located a distance away from the ballast coils and core. In practical applications during normal operation, ballast coil temperatures often reach temperatures that significantly exceed the rated fuse operating temperature which is typically around 125 C. By positioning the fuses in the lead wires away from the core and coils, the fuse's operating temperatures will not be exceeded.

The use of a thermal protector in accordance with certain embodiments of the present invention does not pose the problems associated with prior art thermal protectors because the ballast is permanently de-energized and disabled when the thermal protector is tripped. Thus, there is no danger, as with prior art resettable thermal protection systems, that the ballast will cool down, be reenergized and revisit the dangerous temperatures over and over again thereby increasing the risk of violent failure.

A key economic benefit of the present invention is that an HID ballast with such protection could be handled by lighting fixture manufactures in the same manner as conventional non-protected open core and coil ballast. There is no need to redesign or modify the lighting fixture to incorporate the protection features of the present invention. At the same time, the combination of fused lead wires with a thermal protector having normally open contacts will provide the fixtures with comprehensive protection against violent ballast end of life failure. More importantly, having comprehensive protection against the violent end of the ballast's life provides opportunities for lighting fixture manufacturers to design light, inexpensive and open fixtures for indoor HID applications thereby reducing the overall cost of an HID lighting system.

Thus, although there have been described particular embodiments of the present invention of a new and useful Fused Lead Wire for Ballast Protection, it is not intended that such references be construed as limitations upon the scope of this invention except as set forth in the following claims.

What is claimed is:

1. A method of preventing non-passive ballast failure caused by overheating in a high-intensity discharge lamp ballast having a primary coil magnetically coupled to a secondary coil, the method comprising:
   detecting a temperature directly from the secondary coil of the ballast;
   comparing the detected secondary coil temperature to a predetermined temperature threshold;
   detecting a current through the primary coil of the ballast;
   comparing the detected current through the primary coil to a predetermined current threshold;
   permanently disabling the ballast in response to one or more of
   a first ballast disabling condition associated with a detected secondary coil temperature in excess of the predetermined temperature threshold and
   a second ballast disabling condition associated with a detected current through the primary coil in excess of the predetermined current threshold;
   wherein the step of permanently disabling the ballast further comprises disabling one or more ballast leads having an integral fuse coupled between a power source and the primary coil of the ballast; and
   wherein the step of permanently disabling the ballast in response to the first ballast disabling condition further comprises triggering a thermal protector with normally open contacts electrically coupled to the primary coil, wherein a portion of the primary coil is shorted by connecting of the normally open contacts.

* * * * *